United States Patent
Couvert et al.

(10) Patent No.: US 7,769,965 B2
(45) Date of Patent: Aug. 3, 2010

(54) DATA PROCESSING WITH DATA TRANSFER BETWEEN MEMORIES

(75) Inventors: Patrice Couvert, Saint-Marcellin (FR); Xavier Cauchy, Laval (FR); Anthony Philippe, Grenoble (FR); Sébastien Ferroussat, Amberieu en Bugey (FR)

(73) Assignee: STMicroelectronics S.A., Montrouge (FR)

( * ) Notice: Subject to any disclaimer, the term of this patent is extended or adjusted under 35 U.S.C. 154(b) by 661 days.

(21) Appl. No.: 11/729,308

(22) Filed: Mar. 27, 2007

(65) Prior Publication Data

US 2007/0288691 A1 Dec. 13, 2007

(30) Foreign Application Priority Data

Mar. 28, 2006 (FR) ................... 06 02695

(51) Int. Cl.
*G06F 12/00* (2006.01)
*G06F 17/30* (2006.01)
(52) U.S. Cl. ....................... 711/154; 711/202
(58) Field of Classification Search ............. 711/154, 711/170, 114, 202, 203; 707/102
See application file for complete search history.

(56) References Cited

U.S. PATENT DOCUMENTS

| 4,603,320 | A | 7/1986 | Farago | 340/347 DD |
|---|---|---|---|---|
| 4,972,470 | A | 11/1990 | Farago | 380/3 |
| 2002/0111972 | A1* | 8/2002 | Lynch et al. | 707/523 |
| 2002/0162119 | A1 | 10/2002 | Yagil et al. | |
| 2005/0175317 | A1* | 8/2005 | Chung et al. | 386/52 |
| 2006/0051062 | A1* | 3/2006 | Kusaka et al. | 386/95 |
| 2006/0056805 | A1* | 3/2006 | Seo et al. | 386/69 |
| 2006/0123980 | A1* | 6/2006 | Nakazono | 84/609 |

FOREIGN PATENT DOCUMENTS

| EP | 0 449 494 A2 * | 10/1991 |
|---|---|---|
| EP | 000449494 A2 * | 10/1991 |
| EP | 1058193 A1 | 12/2000 |
| EP | 1355487 A1 | 10/2003 |
| JP | 2000305891 A | 11/2000 |
| WO | 0004443 A1 | 1/2000 |

* cited by examiner

*Primary Examiner*—Pierre-Michel Bataille
(74) *Attorney, Agent, or Firm*—Lisa K. Jorgenson; Timothy L. Boller; Seed IP Law Group PLLC

(57) ABSTRACT

Data stored in a first memory are processed by a processing device comprising a processor, a second memory, and an interface device interfacing the processing of data from the first memory. In the interface device, in order to facilitate transfer of data from the first memory where data are stored in a first data format to the second memory where data are stored in a second data format, a first group of data is received from the first memory, with said group ordered into a sequence corresponding to the first data format. Then at least one second group of data is obtained by ordering said data in the first group into a new sequence which is a function of the first and second data formats. The second group of data is stored in the second memory.

25 Claims, 7 Drawing Sheets

DATA PROCESSING WITH DATA TRANSFER BETWEEN MEMORIES

BACKGROUND OF THE INVENTION

1. Field of the Invention

The present disclosure concerns data processing comprising a data transfer between memories, more specifically a data transfer achieved through the use of a Direct Memory Access (DMA) device.

2. Description of the Related Art

In certain applications such as video, a mass storage device, hereinafter called the external storage, stores the data which are to be processed by a processor using a given algorithm. In the conventional method, the processor has access to a processing memory, hereinafter called the internal memory, which is directly associated with it and from which it retrieves the data to be processed. Therefore the data are first transferred from the external storage to the internal memory before being processed by the processor.

It is conventional to use a DMA device to perform the data transfer between the external storage and the internal memory. A DMA device allows direct data transfers between an external storage and an internal memory associated with a processor, without requiring the intervention of the microprocessor, with the notable exception of initiating and concluding the data transfer. Thus the DMA device reduces the processor load, because the data transfer may then be achieved almost without processor intervention. In this type of data transfer, the data, which are stored in a given data format in the external storage, are stored using the same format in the internal memory.

BRIEF SUMMARY OF THE INVENTION

An embodiment of the present invention is intended to reduce the processor load in the steps where data are read from and written to the internal memory for use by the data processing algorithm.

A first aspect of an embodiment of the invention proposes a method for processing the data stored in a first memory by a processing device, comprising a processor, a second memory, and an interface device interfacing the processing device with the first memory.

An embodiment of this method comprises the following steps, performed by the interface device in order to transfer data from the first memory, in which the data are stored in a first data format, to the second memory, in which the data are stored in a second data format:

/a/ receiving from the first memory a first group of data ordered in a sequence corresponding to the first data format, /b/ obtaining at least one second group of data by ordering said first group of data into a new sequence which is a function of the first and second data formats, and /c/ storing the second group of data in the second memory.

With these steps, a format conversation may advantageously be performed simultaneously with the transfer of data from the first memory, or external storage, to the second memory, or local processor memory or internal memory.

A format conversion may be established within a DMA, thus reducing the workload of the processor. In addition, the core processing may advantageously remain independent of the storage format of the data to be processed, because it is easy in one embodiment of the invention to adapt any type of storage format in the first memory to any type of storage format in the second memory. For example, if the first data format changes, only the firmware may be slightly modified, but the kernel of the algorithm is independent and therefore does not have to be modified.

Advantageously, the processor can then be dedicated to tasks other than managing the format of the data stored in its local memory, because in one embodiment of the invention the format of the data stored in its local memory is already suitable for the processing which will be applied.

Step /b/ may be achieved by applying to the first group of data a mathematically bijective circular shift function which is a function of the first and second data formats.

In one variant, in step /b/, the data in the first group of data are divided into multiple second groups of data, according to a distribution which is a function of the first and second data formats.

In this way, one is advantageously able to store in the desired locations the data retrieved from the first memory.

Step /a/ may be triggered by reading the first group of data from the first memory.

When the first data format is suitable for storing a first and a second type of data in an interlaced manner in the first memory, and the second data format is suitable for storing the first and second types of data in a deinterlaced manner, step /b/ may, for example, comprise the following steps:

grouping the data of the first type into a first subgroup and the data of the second type into a second subgroup, and storing the first subgroup in a first part of the second memory and storing the second subgroup in a second part of the second memory.

Thus, during the transfer, the data storage format may advantageously be suitable for a processing of the data which is applied separately to the different types of data to be processed.

After the storage step /c/, the next steps may also be performed:

/d/ processing the data stored in the second memory, then storing the processed data in the second memory using the second data format, /e/ in the interface device, receiving from the second memory a group of processed data ordered into a sequence corresponding to the first data format, /f/ obtaining another group of data by ordering said processed data from said group into a new sequence which is a function of the first and second data formats, and /g/ storing said other group of data in the first memory.

In this manner, space can be freed in the second memory for storing new data which have not yet been processed. The data transfer between the first and second memories may therefore advantageously be done either from the first to the second memory, for data which are to be processed, or in the other direction, from the second memory to the first memory, for data which have already been processed.

The data stored in this way, and transferred according to an embodiment of the invention, may correspond to luminance and chrominance information concerning the pixels of a video image.

A second aspect of an embodiment of the invention proposes an interface device in a data processing device which additionally comprises a processor. The interface device is suitable for transfers from a first memory where data are stored in a first data format, to a second memory where data are stored in a second data format. The interface device comprises:

a receiving unit adapted for receiving from the first memory a first group of data ordered into a sequence corresponding to the first data format, a format management unit adapted for providing at least one second group of data by ordering said first group of data into a new sequence which is a function of the first and second data formats, a transfer unit adapted for storing the second group of data in the second memory.

The format management unit may apply a mathematically bijective circular shift function to the first group of data, where said circular shift function is a function of the first and second data formats.

The receiving unit may also be suitable for receiving from the second memory a group of data processed by the processor and ordered in a sequence corresponding to the second data format; the format management unit may also be suitable for providing another group of data by ordering the processed data in the group into a new sequence which is a function of the first and second data formats; and the transfer unit is also suitable for storing said other group of data in the first memory.

A third aspect of an embodiment of the invention proposes a system for processing data, comprising a first memory where data are stored in a first data format; and a data processing device including a second memory where data are stored in a second data format, a processor for processing the data stored in the second memory, and an interface device. The interface device comprises:

a receiving unit adapted for receiving from the first memory a first group of data ordered into a sequence corresponding to the first data format, a format management unit adapted for providing at least one second group of data by ordering said first group of data into a new sequence which is a function of the first and second data formats, a transfer unit adapted for storing the second group of data in the second memory.

In one aspect, a method for processing data stored in a first memory by a processing device comprising a processor, a second memory and an interface device interfacing the processing device with the first memory, comprises the following steps, implemented in the interface device, for transferring data from the first memory, in which the data are stored in a first data format, to the second memory, in which the data are stored in a second data format: receiving from the first memory a first group of data, ordered into a sequence corresponding to the first data format; obtaining at least one second group of data by ordering the data in the first group into a new sequence which is a function of the first and second data formats; and storing the second group of data in the second memory. In one embodiment, the step of obtaining at least one second group of data comprises applying to the first group of data a mathematically bijective circular shift function which is a function of the first and second data formats. In one embodiment, the step of obtaining at least one second group of data comprises dividing the data of the first group of data into multiple second groups of data according to a division which is a function of the first and second data formats. In one embodiment, the step of receiving from the first memory the first group of data is triggered by a read of the first group of data from the first memory. In one embodiment, the first data format being suitable for storing a first and a second type of data in an interlaced manner in the first memory, and the second data format being suitable for storing the first and second types of data in a non-interlaced manner, the step of obtaining a least one second group of data comprises the following steps: grouping the data of the first type into a first subgroup and the data of the second type into a second subgroup; and storing the first subgroup in a first part of the second memory and storing the second subgroup in a second part of the second memory. In one embodiment, the method additionally comprises the following steps, after the storage step: processing the data stored in the second memory, then storing the processed data in the second memory using the second data format; at the interface device level, receiving from the second memory a group of processed data ordered into a sequence corresponding to the second data format; obtaining another group of data by ordering the processed data from the group received from the second memory into a new sequence which is a function of the first and second data formats; and storing the obtained group of data in the first memory. In one embodiment, the groups of data correspond to luminance information and chrominance information concerning pixels of a video image.

In another aspect, an interface device in a data processing device which additionally comprises a processor, the interface device being suitable for transferring from a first memory which stores data in a first data format, to a second memory which stores data in a second data format, the interface device comprises: a receiving unit adapted for receiving from the first memory a first group of data ordered into a sequence corresponding to the first data format; a format management unit adapted for providing at least one second group of data by ordering the first group of data into a new sequence which is a function of the first and second data formats; and a transfer unit adapted for storing the second group of data in the second memory. In one embodiment, the format management unit is configured to apply a mathematically bijective circular shift function to the first group of data, the circular shift function being a function of the first and second data formats. In one embodiment, the receiving unit is additionally able to receive from the second memory a group of data processed by the processor and ordered into a sequence corresponding to the second data format, the format management unit is additionally able to provide another group of data by ordering the processed data of the group received from the second memory into a new sequence which is a function of the first and second data formats, and the transfer unit is additionally able to store the other group of data ordered into the new sequence in the first memory.

In one aspect, a data processing system comprising a first memory which stores data in a first data format, and a data processing device including a second memory which stores data in a second data format, a processor able to process data stored in the second memory, and an interface device, the interface device comprising: a receiving unit adapted for receiving from the first memory a first group of data ordered into a sequence corresponding to the first data format; a format management unit adapted for providing at least one second group of data by ordering the data of first group into a new sequence which is a function of the first and second data formats; and a transfer unit adapted for storing the second group of data in the second memory. In one embodiment, the format management unit is adopted to provide two data sets and the transfer unit is configured to store the first data set in a first buffer in the second memory and the second data set in a second buffer in the second memory. In one embodiment, the first data set comprises luminance information and the second data set comprises chrominance information for pixels of a video image.

In one aspect, a circuit comprises: a first memory configured to store video data; means for processing video data stored in the first memory in a first format; and means for retrieving video data stored in a second memory in a second format and storing the retrieved video data in the first format in the first memory. In one embodiment, the means for retrieving and storing comprises firmware. In one embodiment, the firmware comprises an erasable and programmable memory. In one embodiment, the means for processing video data is configured to read and write video data to the first memory in the first format and the means for retrieving and storing is configured to retrieve video data stored in the first memory in the first format and to output the video data retrieved from the first memory to the second memory in the second format. In one embodiment, the means for retrieving and storing is configured to apply a mathematical bijective circular shift function to video data retrieved from the second memory. In one embodiment, the shift function is based on the first and second data formats.

In one aspect, a method for preparing video data for processing by a processor comprises: receiving a request for video data from the processor; retrieving the requested video data in a first format from a first memory; converting the requested video data to a second format; storing the converted video data in a second memory in the second format; and providing the stored converted video data to the processor in the second format. In one embodiment, the method further comprises: receiving a request to store video data from the processor; retrieving the video data to be stored from the second memory in the second format; converting the video data to be stored to the first data format; storing the converted video data to be stored in the first memory. In one embodiment, the method further comprises: revising the first data format.

In one aspect, a computer-readable memory medium stores instructions for causing a computing device to perform a method, the method comprising: receiving a request for video data from a processor; retrieving the requested video data in a first format from a first memory; converting the requested video data to a second format; storing the converted video data in a second memory in the second format; and providing the stored converted video data to the processor in the second format. In one embodiment, the method further comprises: receiving a request to store video data from the processor; retrieving the video data to be stored from the second memory in the second format; converting the video data to be stored to the first data format; and storing the converted video data to be stored in the first memory. In one embodiment, converting the requested video data comprises applying a mathematical bijective circular shift function to the retrieved data.

Other objects, features, and advantages of embodiments of the invention will become apparent in reading the accompanying description.

BRIEF DESCRIPTION OF THE SEVERAL VIEWS OF THE DRAWINGS

The disclosure will also be better understood by referring to the drawings, in which.

DETAILED DESCRIPTION OF THE INVENTION

In certain circumstances, the data storage format in the external storage differs from the data format to be applied to the data by the processor in the processing algorithm. The format used by the data processing algorithm may correspond either to a characteristic of the algorithm for processing the video data, or to a characteristic which allows increasing the performance of the algorithm used to process the video data.

Under such circumstances, the processor is queried in order to retrieve the data in its internal memory and arrange them into the appropriate format for the processing algorithm. The result is an increase in the processor load.

In the domain of video data processing, there are several storage formats used, and various algorithms for processing these data which require different data formats. As a consequence, the format for storing the data and the format required by the processing algorithm to be applied to the stored data may not correspond to each other in such a context. The result is that the processor is placed in charge of managing this difference in format, which increases its workload.

Video images are encoded using chrominance information and luminance information combined. To convert a video signal into luminance and chrominance data, the signal is sampled. Then chrominance and/or luminance data are associated with all or part of the samples depending on the encoding used.

Different types of encoding are used. For example, the terms '4:2:2' and '4:2:0' designate different coding formats used, each describing a different digital image structure. The term 4:2:2 signifies that the chrominance is horizontally subsampled by a factor of two relative to the luminance. The term 4:2:0 signifies that the chrominance is horizontally and vertically subsampled by a factor of two relative to the luminance. Therefore the stored data may vary not only with the encoding of the video image, which provides more or less luminance and chrominance data for a video image, but also with the format for storing the encoded data, since the chrominance and luminance data may be stored in successive alternation in the order of the pixels of an image, or stored separately with the chrominance data on one side and the luminance data on another.

Figure 1:
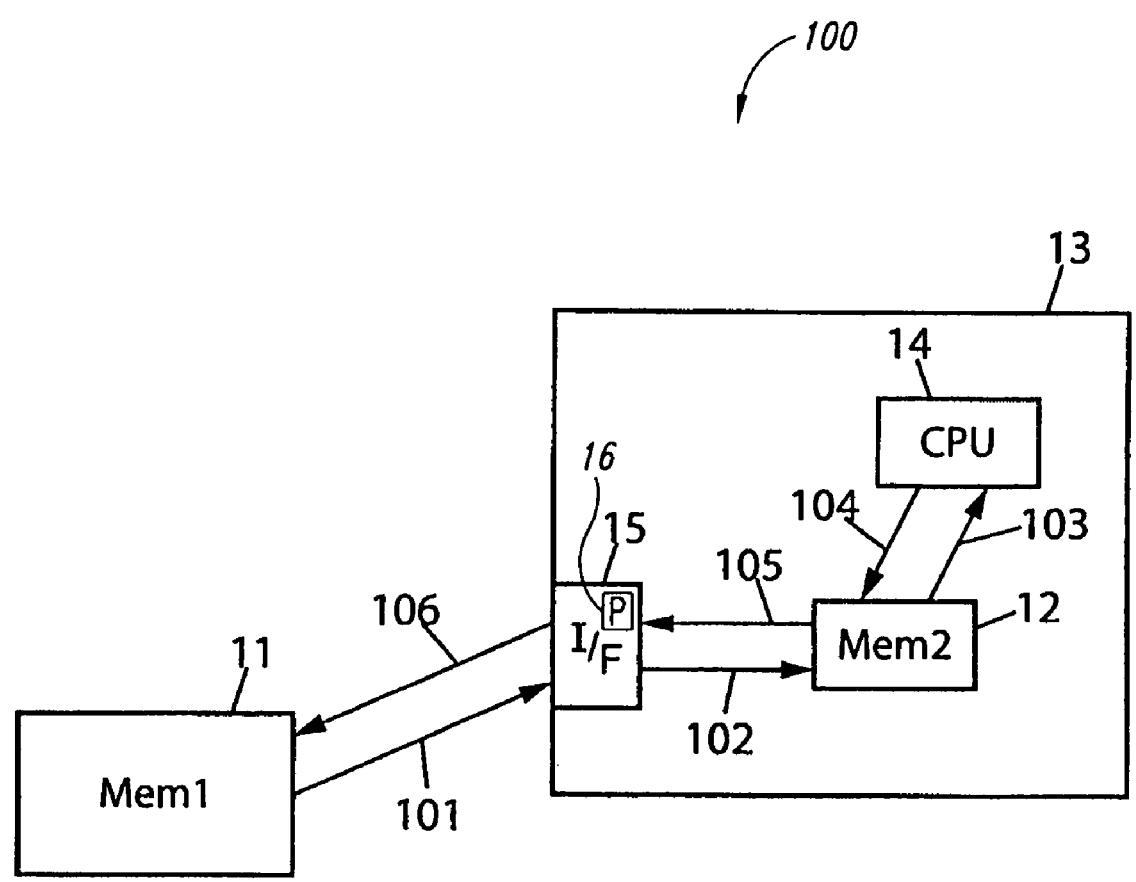
FIG. 1 illustrates a memory architecture in which an embodiment of the invention is applied, FIG. 2-A illustrates the steps of a method according to an embodiment of the invention, FIG. 2-B illustrates a function implemented in an interface unit, or interface device, according to an embodiment of the invention.

FIG. 1 illustrates an embodiment of a system 100 in an architecture comprising a first external storage 11 external to a video data processing entity 13. This video processing entity comprises a processor, or CPU for 'Central Processing Unit' 14, and a second local memory 12 which is associated with the processor 14. The video processing entity 13 additionally comprises an interface unit 15, or interface device, for receiving 101 video data from the external storage 11 and sending 102 the data to the second memory 12, and also for receiving 105 video data from the second memory 12 and sending 106 the data to the first memory 11 according to an embodiment of the invention.

In fact, a data transfer 103 may be done from the second memory 12 to the processor 14 which is in charge of processing the video data stored in the local memory 12. In certain cases, for example when the processor applies complex algorithms which require multiple steps to process or when the amount of the video data is too large to be processed in a single step, the processor 14, after having executed a step, transfers in step 104 the processed data to the second memory 12. These data may then be sent to the first memory in step 106 so as to free the space in the second memory 12 and enable the processor to continue processing video data.

In an embodiment of the invention, this interface unit 15 does the data transfers from the first memory 11 to the second memory 12, and the transfers from the second memory 12 to the first memory 11, symmetrically. Therefore only the data transfer from the first memory 11 to the second memory 12 is described in the following sections, as it is then easy to infer the data transfer from the second memory 12 to the first memory 11.

Figure 2A:
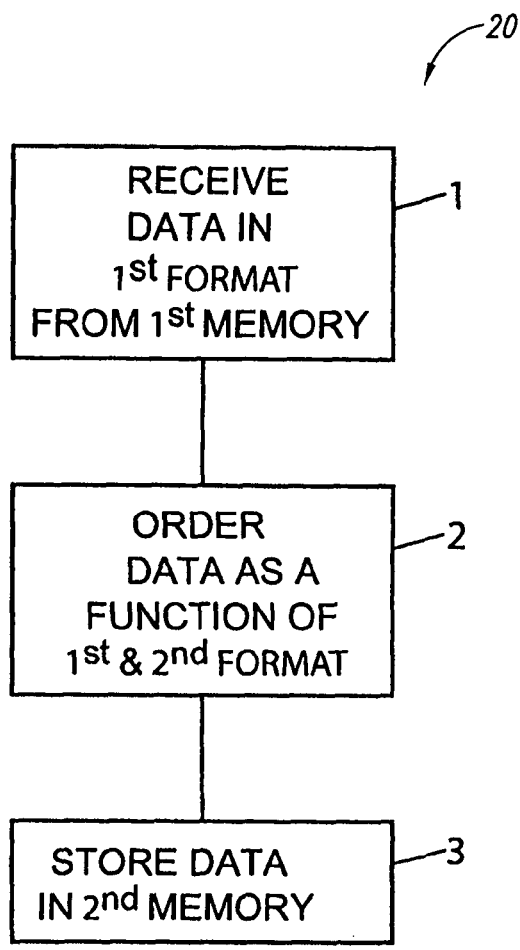
Figure 2B:
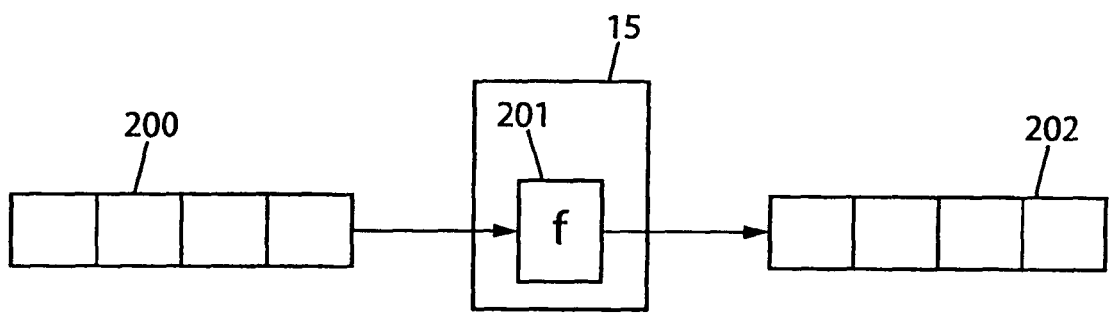

FIG. 2-A illustrates the primary steps of a method 20 according to an embodiment of the invention. In step 1, data are received from a first memory. These data are received as a group of data, with each group ordered into a sequence corresponding to the data storage format in the first memory 11.

Then in step 2, these data are reordered within the group of data. The new sequence into which they are placed is determined based on the first storage format in the first memory and the second format corresponding to the format suitable for the processing performed by the processor 14.

Lastly in step 3, the reordered data are then stored in the second memory 12.

When the data to be sent from the first memory to the second memory are more numerous than the data contained in the group of data in question, steps 1-3 may be repeated so as to transfer all the data stored in the first memory 11 to be processed by the processor 14.

In one embodiment of the invention, these steps are implemented in the interface unit 15.

In order to trigger the receiving of the group of data in step 1, the interface unit 15 may issue a command to read from the first memory 11, specifying a memory address corresponding to the first data to be read from said memory as well as a size for the group of data to be read, or the read group.

The interface unit 15 knows the storage format for the data in the first memory and the desired format for storage in the second memory to achieve efficient treatment of the data by the processor 14, and based on these two formats determines the function to be applied to the group of data received from the first memory 11 before storing these data in the second memory 12. Such a function obtains from the sequence in which the data are ordered in a first group, a sequence in which the data are ordered in a second group.

FIG. 2-B illustrates such a function, implemented in the interface unit 15 according to an embodiment of the invention. A read group 200, meaning a first group of data retrieved from the first memory 11, is received by the interface unit 15. In this first group 200 the data are ordered into a sequence which corresponds to the first format. Then this group of data is processed by the interface unit 15 which applies a mathematical function f to yield a second group of data 202 comprising the data of the first group of data 200, ordered into a sequence which corresponds to the desired storage format for the second memory 12. This mathematical function f is determined based on the first and second format.

The following sections detail an embodiment of the invention for different cases of data transfers. In a first case, data stored in the first memory 11 in a single shared memory space are transferred into two separate memory spaces in the second memory 12. In a second case, data stored in first memory 11 in a single shared memory space are transferred into a single shared memory space in the second memory 12, but in a different storage format.

From the different cases detailed below, it is easy to infer variants of the data transfer for any type of storage format in the first and second memory.

Figure 3:
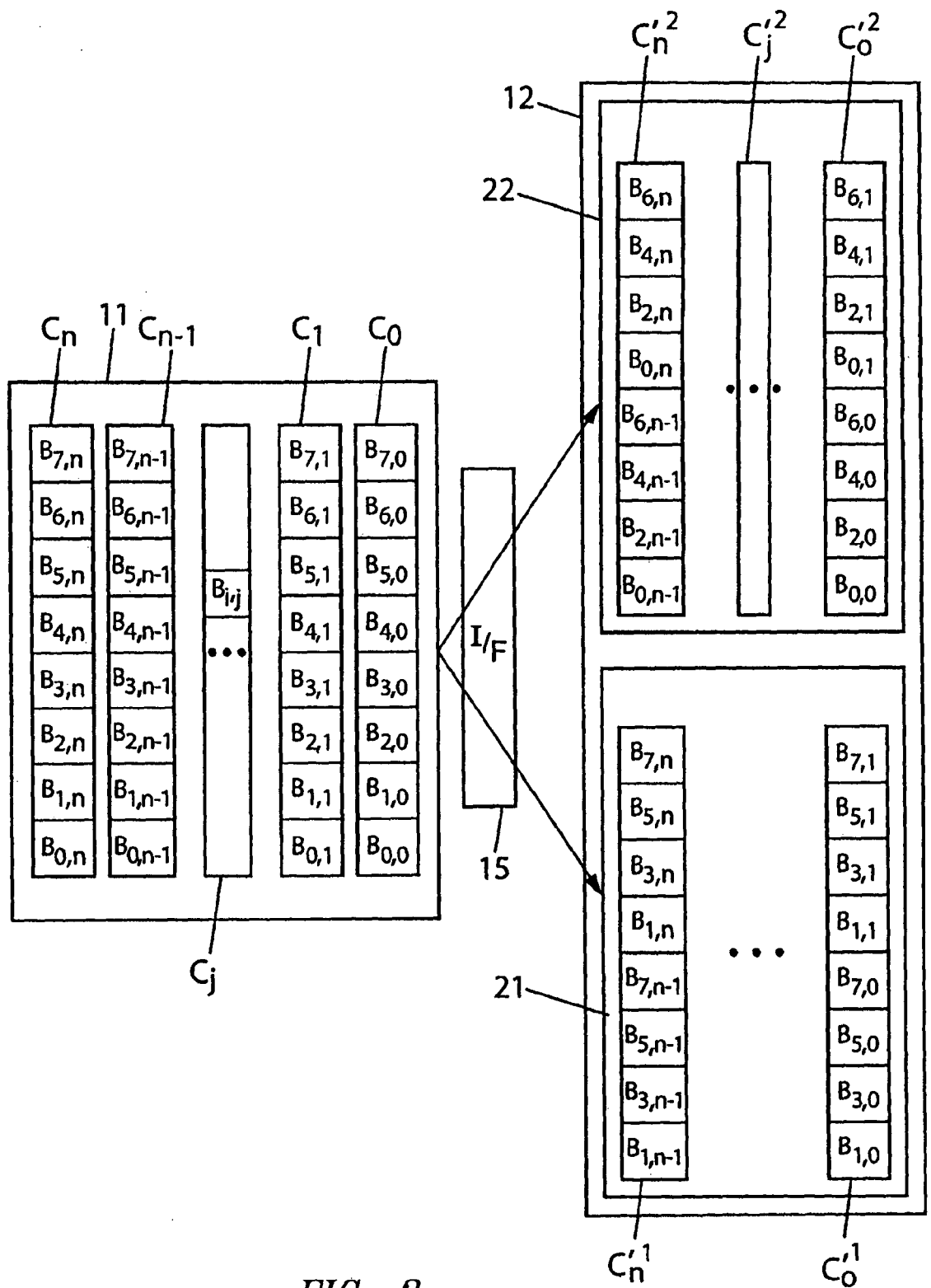
FIGS. 3-5 illustrate a data transfer according to an embodiment of the invention, in a first and a second case.

FIG. 3 illustrates an embodiment of the invention corresponding to the first case of data transfer. As an example, each datum to be manipulated has a size of 1 byte and is portrayed as a block $B_{i,j}$. The data stored in the memory 11 are grouped into storage cells, where each cell $C_j$ has a j value of between 0 and n, comprising a number K of data. The number K may be equal to 8.

The data stored in the memory 12 are also grouped into cells $C'^1_j$ and $C'^2_j$, in a first buffer 21 and a second buffer 22, respectively, where j is between 0 and n. These storage cells of the second memory 12 may be identical in size to the storage cells of the first memory 11.

In this example, the processor 14 executes a data processing algorithm which requires distinctly separate processing for two types of data, for example chrominance data and luminance data, while in the first memory 11 these two types of data are stored in successive alternation in the order of the pixels sampled from the image in question, such that these data are interlaced. Thus in one embodiment of the invention, during the transfer of data from the first memory 11 to the second memory 12, the interface unit 15 reformats the data so as to adapt the data to the storage format in the local memory for the processing to be done by the processor 14 on these data.

The data to be retrieved from the first memory are stored in a shared memory space in the first memory 11. Advantageously these data are then divided and placed in two distinct memory spaces, or buffers 21 and 22, in the second memory 12. For example, buffer 21 may contain data concerning luminance and buffer 22 may contain data concerning chrominance.

In this context, the chrominance and luminance data for the successive pixels of the video images in question may alternate in storage. More specifically, for example, the luminance data may correspond to the data $B_{i,j}$ where is an even number, and the chrominance data may correspond to the data $B_{i,j}$ where i is an odd number, in the first memory 11.

To provide a data format relevant to the processor, advantageously the interface unit 15 may retrieve from the first memory all the data $B_{i,j}$ where i is an even number and store these data in the first buffer 21, and retrieve the data $B_{i,j}$ where i is an odd number and store these data in the second buffer 22.

In one embodiment of the invention, the interface unit 15 is a DMA device. The interface unit 15 may comprise a format management unit, such as circuitry 16. The circuitry 16 may comprise, for example, a processor and/or firmware, such as, for example, a flash memory, a ROM, a PROM, an E-PROM, an EEPROM and/or a FOTA.

Reading data from the memory 15 may be controlled by the following parameters:
- a starting address for reads from the first memory 11, which defines the first byte to be transferred from memory 11 to memory 12,
- a size for the data to be transferred, which defines the number N of bytes to be transferred,
- a starting address for storing data in the first buffer 21 of the second memory 12, and
- a starting address for storing data in the second buffer 22 of the second memory 12.

In this example, the data are retrieved from the memory 11 by read group 200, where each group comprises N data. The number N may be equal to 8. Here the read groups correspond to storage cells as defined above.

Then the data are written to the second memory 12 by write group 202, where each group comprises a number M of data. The number M may be equal to the number N.

No limitation is attached to the number of data in a read or write group. These read and write groups may also comprise different numbers of data. In the example in question in the following sections, the numbers K, N and M are equal to 8.

In this example, when a read group of 8 data blocks of 1 byte each is transferred from the first memory 11, the interface unit 15 places the $B_{i,j}$ data where is the even number in the first buffer 21, and the $B_{i,j}$ data where i is the odd number in the second buffer 22, in order to form respective write groups for the first and second buffers. When a write group 202 is full, meaning in this example when a write group contains 8 data blocks to be stored in one of the two buffers, then said group of data is written to the corresponding buffer in the second memory 12.

More generally, in one embodiment of the invention, the interface unit 15 retrieves the data stored in the first memory and applies the mathematical function f which is based on both the first data storage format in the first memory and the second data storage format in the second memory, with the latter advantageously defined as a function of the characteristics of the processing to be applied to these data by the processor 14.

Thus the cells $C_j$ and $C_{j+1}$ of the first memory 11, where j is a whole even number, are divided up and placed into a first cell of the first buffer 21 and into a second cell of the second buffer 22. More specifically, the following storage cells in the first memory 11:

$$C_j = B_{0,j}; B_{1,j} \ldots B_{7,j}$$

and $$C_{j+1} = B_{0,j+1}; B_{1,j+1} \ldots B_{7,j+1}$$

are stored in a cell $C'^1_j$ in the first buffer 21 and in a cell $C'^2_j$ in the second buffer 22, so as to separate the luminance data and the chrominance data. These cells satisfy:

$$C'^1_j = B_{0,j}, B_{2,j}, B_{4,j}, B_{6,j}, B_{0,j+1}, B_{2,j+1}, B_{4,j+1}, B_{6,j+1}$$

$$C'^2_j = B_{1,j}, B_{3,j}, B_{5,j}, B_{7,j}, B_{1,j+1}, B_{3,j+1}, B_{5,j+1}, B_{7,j+1}$$

Figure 4:
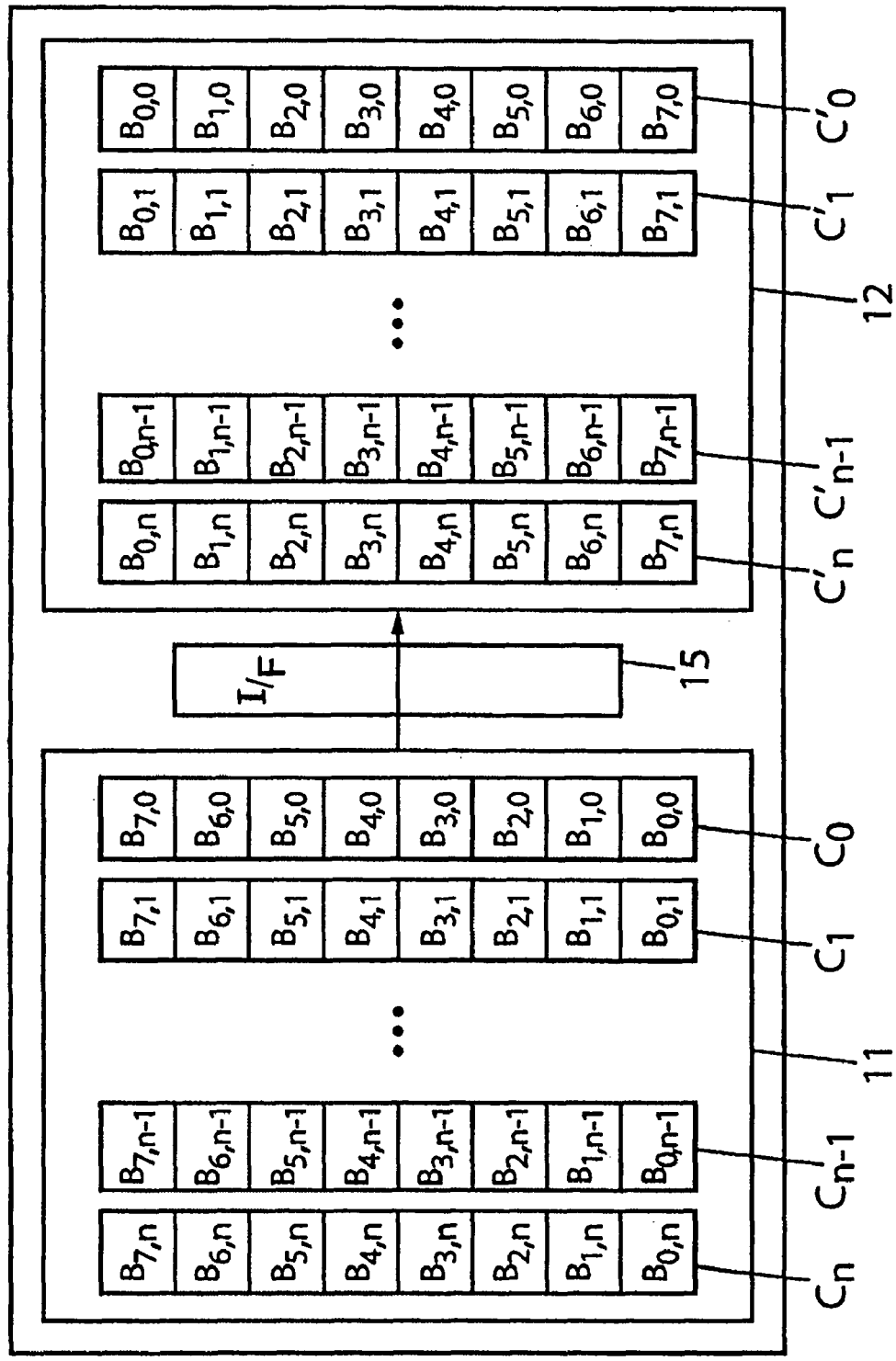

FIG. 4 illustrates an embodiment of the invention corresponding to the second data transfer case. In this context, the data stored in a first format in a shared memory space in the first memory 11 are stored in a second format in the second memory 12 but still in a shared memory space.

One advantageous application of this type of data transfer according to one embodiment of the invention corresponds to a correction of the order in which the bytes are arranged in memory, or the 'endianness'. In the example below, such a correction takes place when the number N of data comprised in a read group 200 is different from the number K of data comprised in a storage cell in the first memory 11. More specifically, this correction to the storage order allows converting from an arrangement of bytes in which the low order byte is stored first in the first memory 11, to an arrangement of bytes where the high order byte is stored first.

Such an application is described as an example, with a number K equal to 8 and a number N satisfying the following equation:

$$N = (n+1)*8 - 2 \quad (1)$$

where n+1 corresponds to the number of storage cells in the first memory 11 to be transferred.

One goal of such an embodiment is to reverse the order in which the data $B_{i,j}$ are stored within each storage cell $C_j$, between the storage cells in the first memory 11 and the storage cells in the second memory 12.

In one embodiment of the present invention, the interface unit 15 is a DMA device. Reading the data from the memory 15 may then be controlled by the following parameters:

a starting address for reading from the first memory 11, which defines the first byte to be transferred from memory 11 to memory 12, a size for the data to be transferred, which defines the number N of bytes to be transferred, meaning the size of a read group 200, and a starting address for storing data in the second memory 12.

The mathematical function f may then be written in the following form:

$$f(B_{0,j}; B_{1,j}; B_{2,j}; B_{3,j}; B_{4,j}; B_{5,j}; B_{6,j}; B_{7,j}) = B_{7,j}; B_{6,j}; B_{5,j}; B_{4,j}; B_{3,j}; B_{2,j}; B_{1,j}; B_{0,j}$$

for all storage cells as defined above.

In one example, the last data block to be transferred to the read group 200 is the data block $B_{5,n}$. As a result, the fields in the cell $C_n'$ corresponding to $B_{6,n}$ and $B_{7,n}$ would not be filled in.

An embodiment of the invention may use any type of function f for transforming the first group of data ordered in a first sequence into one or more groups of data ordered in one or more respective sequences.

The function f has the characteristics for ordering the data retrieved from the first memory into a given order in the second memory, based on the characteristics of the algorithm to be applied.

In order to write the data successively retrieved from the first memory to given non-successive locations in the second memory, the function f is based on the write mode for the second memory. In the example case described, the data are written to the second memory by 8-byte group.

For example, the function f can be adapted to generate multiple 8-byte groups of data from a first 8-byte group of data, $Z_0$ to $Z_7$. In these multiple groups of data, only a part of the bytes of a same group of data correspond to one of the bytes in the first group of data $Z_0$ to $Z_7$. Proceeding in this way, it is possible to write to locations in the second memory which do not have successive addresses.

Figure 5:
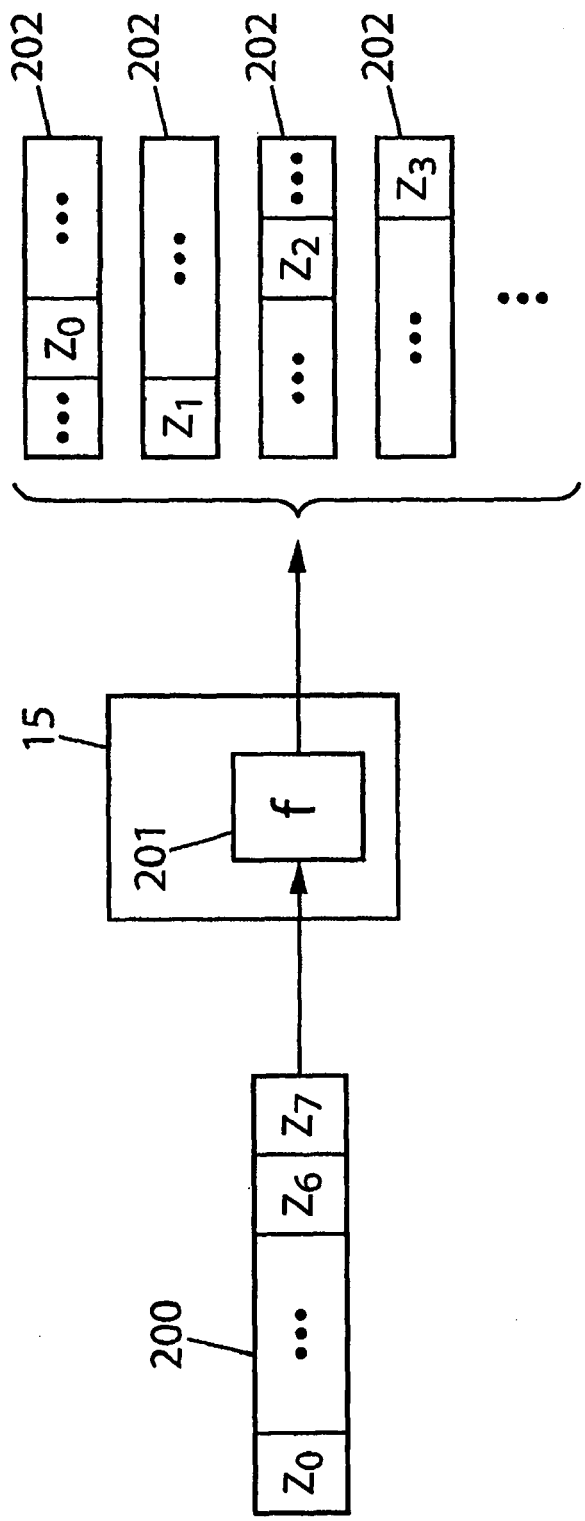

FIG. 5 illustrates such an embodiment. The first group of data 200 comprises 8 bytes $Z_0$-$Z_7$. The function f stores these bytes in the second memory in the form of second groups of data 202, each comprising one of the bytes in the first group of data 200. Then each of these multiple second groups of data 202 can be successively written to the second memory.

Proceeding in this way, the function f allows writing the data to given locations in the second memory, suitable for processing by the processor.

The other bytes in the second groups of data 202 may be of any value, or may correspond to a byte value which indicates not to write to the second memory, and therefore to save the value stored in the second memory before writing said second byte.

Figure 6:
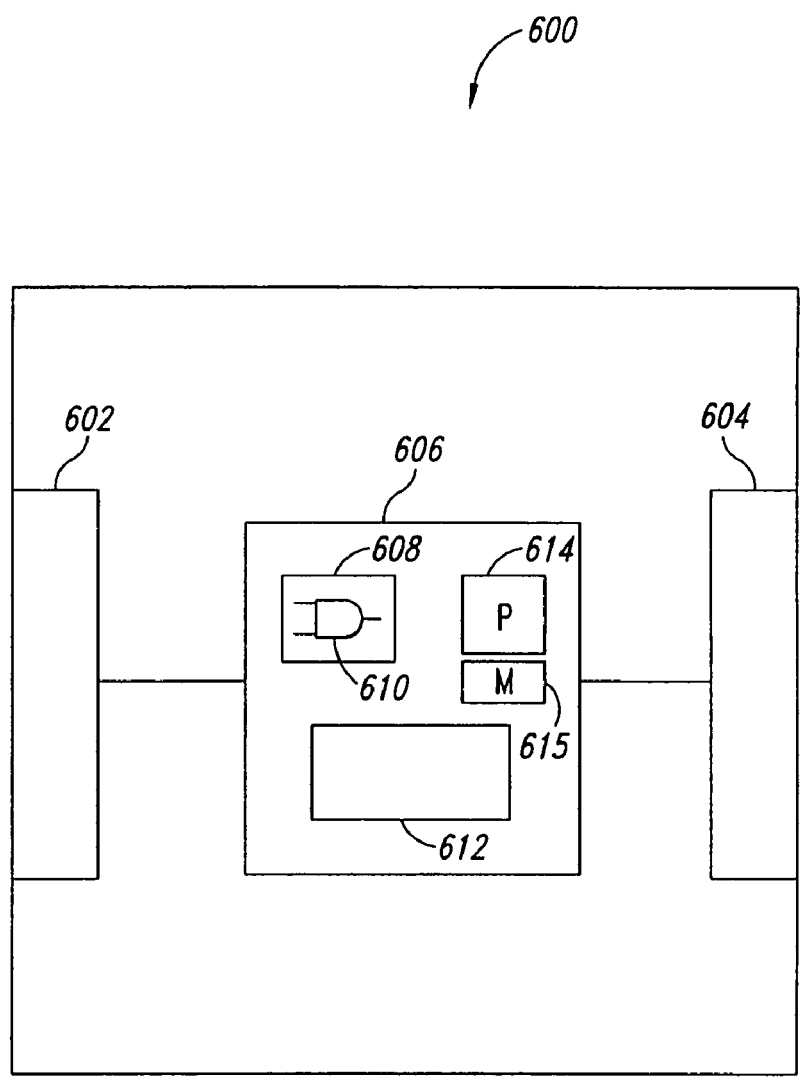
FIG. 6 is a functional block diagram of an embodiment of an interface suitable for use in the embodiments illustrated in FIGS. 1 and 5.

FIG. 6 is a functional block diagram of an embodiment of an interface 600 suitable for use, for example, in the embodiments illustrated in FIGS. 1 and 5. The interface 600 comprises a receiving unit 602 configured to receive and transmit data between the interface 600 and a first memory (see memory 11 of FIG. 1), a transmitting unit 604 configured to receive and transmit data between the interface 600 and a second memory (see memory 12 of FIG. 1) and a format management unit 606 configured to control the receiving and transmitting of data by the interface unit 600. The format management unit 606, the receiving unit 602 and/or the transmitting unit may comprise, for example, discrete circuitry, firmware, other processors, memories and/or combinations thereof. As illustrated, format management unit 606 comprises discrete circuitry 608 including a logic gate 610, firmware 612, such as an EEPROM, a processor 614 and a memory 615.

Figure 7:
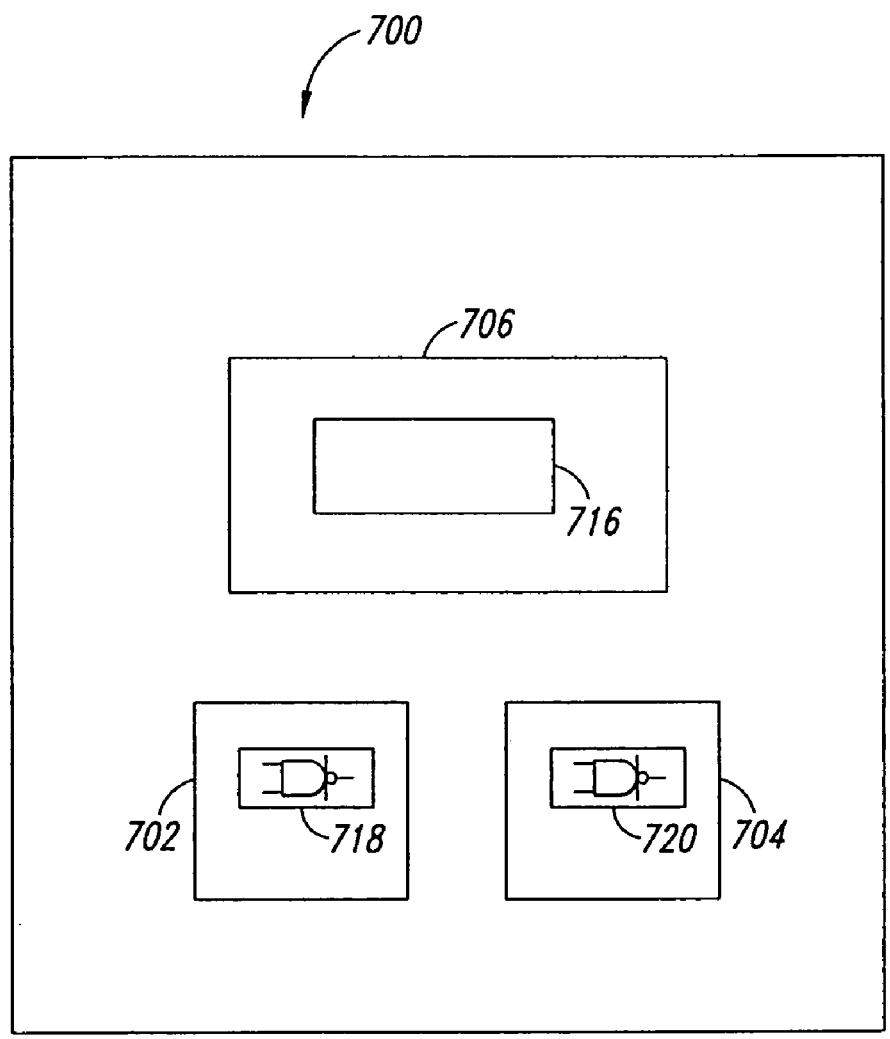
FIG. 7 is a functional block diagram of an embodiment of an interface suitable for use in the embodiments illustrated in FIGS. 1 and 5.

FIG. 7 is a functional block diagram of another embodiment of an interface 700 suitable for use, for example, in the embodiments illustrated in FIGS. 1 and 5. The interface 700 comprises a receiving unit 702 configured to receive data from at least two memories (see memories 11 and 12 of FIG. 1), a transmitting unit 704 configured to transmit and receive data between the interface 700 and the two memories and a format management unit 706 configured to control the receiving and transmitting of data by the interface unit 700. The format management unit 706, the receiving unit 702 and/or the transmitting unit 704 may comprise, for example, discrete circuitry, firmware, other processors and/or combinations thereof. As illustrated, format management unit 706 comprises firmware 716, such as an EEPROM, the receiving unit 702 comprises discrete circuitry 718 and the transmitting unit 704 comprises discrete circuitry 720.

The present invention is not limited to the preferred embodiments described above. Also, the terms "external" and "internal", and the expressions "storage" and "processing", do not limit the application of the principles of the invention to a given hardware architecture. For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via ASICs. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for processing data stored in a first memory by a processing device comprising a processor, a second memory and an interface device interfacing the processing device with the first memory, comprising the following steps, implemented in the interface device, for transferring data from the first memory, in which the data are stored in a first data format, to the second memory, in which the data are stored in a second data format, the method comprising:
   receiving from the first memory a first group of data, ordered into a sequence corresponding to the first data format;
   obtaining at least one second group of data by ordering the data in the first group into a new sequence which is a function of the first and second data formats; and
   storing the second group of data in the second memory.

2. A method for processing data according to claim 1 wherein the step of obtaining at least one second group of data comprises applying to the first group of data a mathematically bijective circular shift function which is a function of the first and second data formats.

3. A method for processing data according to claim 1 wherein the step of obtaining at least one second group of data comprises dividing the data of the first group of data into multiple second groups of data according to a division which is a function of the first and second data formats.

4. A method for processing data according to claim 1, wherein the step of receiving from the first memory the first group of data is triggered by a read of the first group of data from the first memory.

5. A method for processing data according to claim 4 wherein the first data format being suitable for storing a first and a second type of data in an interlaced manner in the first memory, and the second data format being suitable for storing the first and second types of data in a non-interlaced manner, the step of obtaining a least one second group of data comprises the following steps:
   grouping the data of the first type into a first subgroup and the data of the second type into a second subgroup; and
   storing the first subgroup in a first part of the second memory and storing the second subgroup in a second part of the second memory.

6. A method for processing data according to claim 1, additionally comprising the following steps, after the storage step:
   processing the data stored in the second memory, then storing the processed data in the second memory using the second data format;
   at the interface device level, receiving from the second memory a group of processed data ordered into a sequence corresponding to the second data format;
   obtaining another group of data by ordering the processed data from the group received from the second memory into a new sequence which is a function of the first and second data formats; and
   storing the obtained group of data in the first memory.

7. A method for processing data according to claim 1, wherein the groups of data correspond to luminance information and chrominance information concerning pixels of a video image.

8. A method for preparing video data for processing by a processor, the method comprising:
   receiving a request for video data from the processor;
   retrieving the requested video data in a first format from a first memory;
   converting the requested video data to a second format by reordering the requested video data into a new data sequence, wherein the reordering is a function of the first and second formats;
   storing the converted video data in a second memory in the second format; and
   providing the stored converted video data to the processor in the second format.

9. The method of claim 8, further comprising:
receiving a request to store video data from the processor;
retrieving the video data to be stored from the second memory in the second format;
converting the video data to be stored to the first data format; and
storing the converted video data to be stored in the first memory.

10. The method of claim 8, further comprising:
revising the first data format.

11. A computer-readable memory medium storing instructions for causing a computing device to perform a method, the method comprising:
receiving a request for video data from a processor;
retrieving the requested video data in a first format from a first memory;
converting the requested video data to a second format by reordering the data into a new data sequence, wherein the reordering is a function of the first and second formats;
storing the converted video data in a second memory in the second format; and
providing the stored converted video data to the processor in the second format.

12. The method of claim 11 wherein the method further comprises:
receiving a request to store video data from the processor;
retrieving the video data to be stored from the second memory in the second format;
converting the video data to be stored to the first data format; and
storing the converted video data to be stored in the first memory.

13. The method of claim 11 wherein converting the requested video data comprises applying a mathematical bijective circular shift function to the retrieved data.

14. An interface device in a data processing device which additionally comprises a processor, the interface device being suitable for transferring from a first memory which stores data in a first data format, to a second memory which stores data in a second data format, the interface device comprising:
a receiving unit adapted for receiving from the first memory a first group of data ordered into a sequence corresponding to the first data format;
a format management unit adapted for providing at least one second group of data by ordering the first group of data into a new sequence which is a function of the first and second data formats; and
a transfer unit adapted for storing the second group of data in the second memory.

15. An interface device according to claim 14, wherein the format management unit is configured to apply a mathematically bijective circular shift function to the first group of data, the circular shift function being a function of the first and second data formats.

16. An interface device according to claim 14, wherein:
the receiving unit is additionally able to receive from the second memory a group of data processed by the processor and ordered into a sequence corresponding to the second data format;
the format management unit is additionally able to provide another group of data by ordering the processed data of the group received from the second memory into a new sequence which is a function of the first and second data formats; and
the transfer unit is additionally able to store the other group of data ordered into the new sequence in the first memory.

17. A data processing system comprising a first memory which stores data in a first data format, and a data processing device including a second memory which stores data in a second data format, a processor able to process data stored in the second memory, and an interface device, the interface device comprising:
a receiving unit adapted for receiving from the first memory a first group of data ordered into a sequence corresponding to the first data format;
a format management unit adapted for providing at least one second group of data by ordering the data of first group into a new sequence which is a function of the first and second data formats; and
a transfer unit adapted for storing the second group of data in the second memory.

18. The system of claim 17 wherein the format management unit is adopted to provide two data sets and the transfer unit is configured to store the first data set in a first buffer in the second memory and the second data set in a second buffer in the second memory.

19. The system of claim 18 wherein the first data set comprises luminance information and the second data set comprises chrominance information for pixels of a video image.

20. A circuit, comprising:
a first memory configured to store video data;
means for processing video data stored in the first memory in a first format; and
means for retrieving video data stored in a second memory in a second format and storing the retrieved video data in the first format in the first memory by reordering the retrieved video data into a new data sequence, wherein the reordering is a function of the first and second formats.

21. The circuit of claim 20 wherein means for retrieving and storing comprises firmware.

22. The circuit of claim 21 wherein the firmware comprises an erasable and programmable memory.

23. The circuit of claim 20 wherein the means for processing video data is configured to read and write video data to the first memory in the first format and the means for retrieving and storing is configured to retrieve video data stored in the first memory in the first format and to output the video data retrieved from the first memory to the second memory in the second format.

24. The circuit of claim 20 wherein the means for retrieving and storing is configured to apply a mathematical bijective circular shift function to video data retrieved from the second memory.

25. The circuit of claim 24 wherein the shift function is based on the first and second data formats.

* * * * *